(12) United States Patent
Bithell et al.

(10) Patent No.: US 8,348,582 B2
(45) Date of Patent: Jan. 8, 2013

(54) CLIP FOR PIN RETENTION

(75) Inventors: Carl Tom Bithell, Chorley (GB); Geoffrey Philip Wade, Lancashire (GB)

(73) Assignee: Joy MM Delaware, Inc., Wilmington, DE (US)

( * ) Notice: Subject to any disclaimer, the term of this patent is extended or adjusted under 35 U.S.C. 154(b) by 631 days.

(21) Appl. No.: 12/467,397

(22) Filed: May 18, 2009

(65) Prior Publication Data

US 2009/0293242 A1    Dec. 3, 2009

(30) Foreign Application Priority Data

Jun. 2, 2008  (GB) ................................... 0810018.2

(51) Int. Cl.
| F16B 21/12 | (2006.01) |
| F16B 21/14 | (2006.01) |
| F16B 21/16 | (2006.01) |
| F16B 21/18 | (2006.01) |

(52) U.S. Cl. ............ 411/513; 411/522; 24/455; 24/522; 24/546; 285/91; 285/404; 403/315; 403/316

(58) Field of Classification Search ............ 24/455, 24/457, 458, 462, 522, 546, 616, 656–658, 24/662, 910; 285/91, 404; 403/315, 316, 403/319, 355; 411/522, 516, 517, 353, 457, 411/469, 513

See application file for complete search history.

(56) References Cited

U.S. PATENT DOCUMENTS

| 1,398,519 | A | * | 11/1921 | Hosch ......................... 248/316.7 |
| 1,458,811 | A | * | 6/1923 | Eckert ........................... 403/319 |
| 1,736,807 | A | * | 11/1929 | Thomas .......................... 248/71 |
| 2,021,241 | A | * | 11/1935 | Mall .............................. 285/276 |
| 2,526,902 | A | * | 10/1950 | Rublee .......................... 174/159 |
| 3,141,221 | A | * | 7/1964 | Faulls, Jr. .................... 24/30.5 R |
| 3,222,448 | A | * | 12/1965 | Rogers et al. ................ 174/395 |
| 3,894,174 | A | * | 7/1975 | Cartun ........................... 174/159 |
| 3,913,954 | A | * | 10/1975 | Klimpl .......................... 285/305 |
| 4,109,672 | A | * | 8/1978 | Szemeredi ............... 137/315.13 |
| 4,244,608 | A | * | 1/1981 | Stuemky ........................ 285/305 |
| 4,923,350 | A | * | 5/1990 | Hinksman et al. ............ 411/457 |
| 4,934,974 | A | * | 6/1990 | Jarosz et al. .................... 445/30 |
| 5,415,491 | A | * | 5/1995 | Hayakawa et al. ........... 403/316 |
| 5,513,882 | A | * | 5/1996 | Lewis ........................... 285/305 |
| 5,593,187 | A | * | 1/1997 | Okuda et al. .................. 285/305 |
| 5,704,100 | A | * | 1/1998 | Swan ............................. 24/656 |
| 5,725,257 | A | * | 3/1998 | Sakane et al. .................. 285/81 |
| 5,752,297 | A | * | 5/1998 | Ramey ........................... 24/462 |
| 6,027,143 | A | * | 2/2000 | Berg et al. ...................... 285/93 |
| 6,152,642 | A | * | 11/2000 | Berthold et al. .............. 403/155 |
| 6,234,706 | B1 | * | 5/2001 | Hodzic ......................... 403/252 |

(Continued)

OTHER PUBLICATIONS

GB0810018.2 Examination Report dated Feb. 28, 2012, 3 pages.

*Primary Examiner* — Victor Batson
*Assistant Examiner* — Tyler Johnson
(74) *Attorney, Agent, or Firm* — Michael Best & Friedrich LLP

(57) ABSTRACT

A clip for a pin that extends from an outer surface of a member, the clip comprising a pin retaining portion and a clamp portion that surrounds the member outer surface, the clamp portion having a pin receiving opening therein adapted to receive the exposed end of the pin, and a pin retaining portion adjacent the pin receiving opening to retain the pin in the member.

5 Claims, 7 Drawing Sheets

U.S. PATENT DOCUMENTS

| | | | |
|---|---|---|---|
| 6,293,596 B1* | 9/2001 | Kinder | 285/305 |
| 6,372,132 B1* | 4/2002 | Williams | 210/232 |
| 6,393,675 B1* | 5/2002 | Gaetke | 24/563 |
| 6,846,021 B2* | 1/2005 | Rohde et al. | 285/81 |
| 7,270,350 B2* | 9/2007 | Cronley | 285/331 |
| 7,390,025 B2* | 6/2008 | Pepe et al. | 285/93 |
| 7,484,774 B2* | 2/2009 | Kerin et al. | 285/305 |
| 7,497,480 B2* | 3/2009 | Kerin et al. | 285/305 |
| 7,506,897 B2* | 3/2009 | Bauer | 285/305 |
| 7,547,048 B2* | 6/2009 | Catlow | 285/305 |
| 7,568,855 B2* | 8/2009 | Fitzler et al. | 403/315 |
| 7,770,940 B2* | 8/2010 | Binder et al. | 285/316 |
| 7,866,711 B2* | 1/2011 | Kerin et al. | 285/319 |
| 2003/0118425 A1* | 6/2003 | Hahn et al. | 411/522 |
| 2003/0159255 A1* | 8/2003 | Senovich et al. | 24/20 R |
| 2004/0036283 A1* | 2/2004 | Furuya | 285/305 |
| 2005/0087981 A1* | 4/2005 | Yamada et al. | 285/81 |
| 2005/0218650 A1* | 10/2005 | Pepe et al. | 285/308 |
| 2005/0236833 A1* | 10/2005 | Poirier et al. | 285/305 |
| 2006/0103134 A1* | 5/2006 | Kerin | 285/305 |
| 2008/0098578 A1* | 5/2008 | Collie | 24/457 |

* cited by examiner

CLIP FOR PIN RETENTION

BACKGROUND

The present disclosure relates to clip retainers used to secure a pin in a member. More particularly, the disclosure relates to clip retainers used to secure a staple in a hydraulic hose connection.

In many hydraulic pieces of machinery, a large number of hose connections are required. One such piece of machinery is a longwall mining installation having a large number of hydraulic roof supports. The roof supports are powered by a number of hydraulic cylinders, controlled by a series of valves. High-pressure hydraulic fluid, at around 5,000 psi, is transported around the roof supports, between the valves and cylinders using numerous hoses.

The hoses typically have staple type connections, and these connections range in both length and bore size. A staple type hose connection 10, as shown in FIG. 1, includes a female sleeve piece 12, a male piece 14 of a size and configuration to permit insertion into the female sleeve piece 12, and a generally U-shaped staple 16.

The male piece has a groove 18, and, when the male piece is received within the female sleeve piece, the groove is aligned with two spaced apart openings 20 and 22 in the female sleeve piece 12. The openings receive the ends of the U-shaped staple 16. As illustrated in FIG. 1, the legs of the U-shaped staple 16 are received within the groove 18 of the male piece 14 and secured by the female sleeve piece 12, thus locking the male piece 14 within the female piece 12. If one attempts to remove the male piece from the female piece, the portion of the male piece forming the groove contacts the staple legs, thus preventing the male piece from being removed from the female piece, until the staple is removed from the connection.

More particularly, staples are shaped so that, when fitted, they are self retaining. The open ends 24 and 26 are wider than the portion of the staple that retains the fitting. The open ends are initially squeezed together so that the staple can be pushed into a connection. The open ends of the staple can then spring out, once the staple is fully inserted. This retains the staple within the hose connection.

But staples can fall out. This concern has lead to additional methods of retention being requested. One method, as illustrated in FIG. 2, is to drill a hole in each of the staple legs, and then to place a wire 30 in each of the holes after assembly of the connection. This stops the staple 16 from falling out under its own weight. But it makes it difficult to later remove the staple from the hose connection. This wire staple retention method significantly increases costs and is time-consuming. It also increases the expenses associated with the operation of the hydraulic equipment.

SUMMARY

One object is to provide a pin retention clip that is easy to fit and remove.

Another object is to provide a pin retention clip that locks itself in position around both the fitting and the staple.

Another object is to provide a pin retention clip that, if assembled properly, holds the staple in place.

Another object is to provide a pin retention clip that is highly visible so it can be quickly seen that it is fitted in place.

Another object is to provide a written warning regarding safety hazards associated with hydraulic connections.

This disclosure provides a clip for a pin that extends from an outer surface of a member, the clip comprising a pin retaining portion and a clamp portion that surrounds the member outer surface, the clamp portion having a pin receiving opening therein adapted to receive the exposed end of the pin, and a pin retaining portion adjacent the pin receiving opening to retain the pin in the member.

Figure 1:
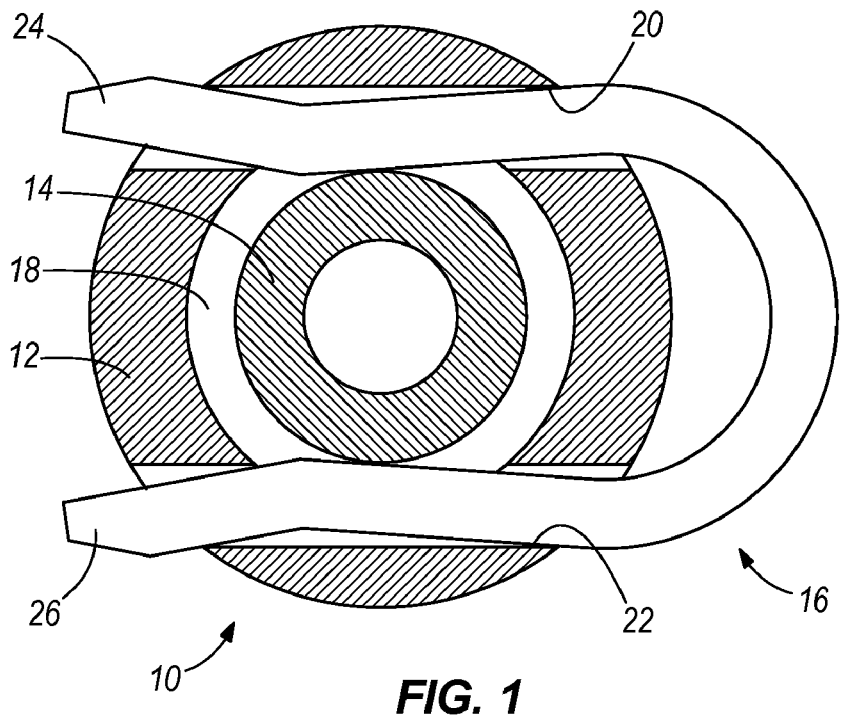
FIG. 1 is a cross-sectional view of a prior art staple type hydraulic connection.
Figure 2:
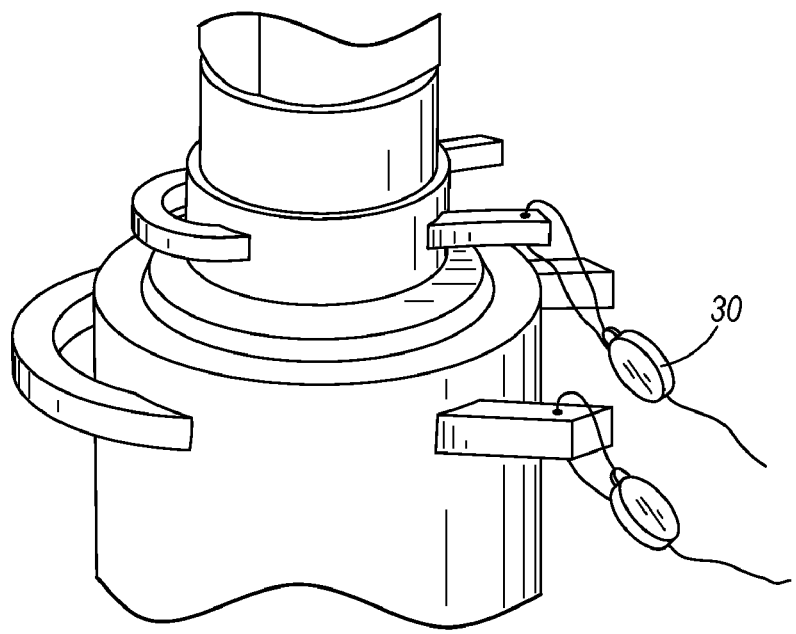
FIG. 2 is a perspective view of a prior art staple type hydraulic connection with a wire retention mechanism.
Figure 3:
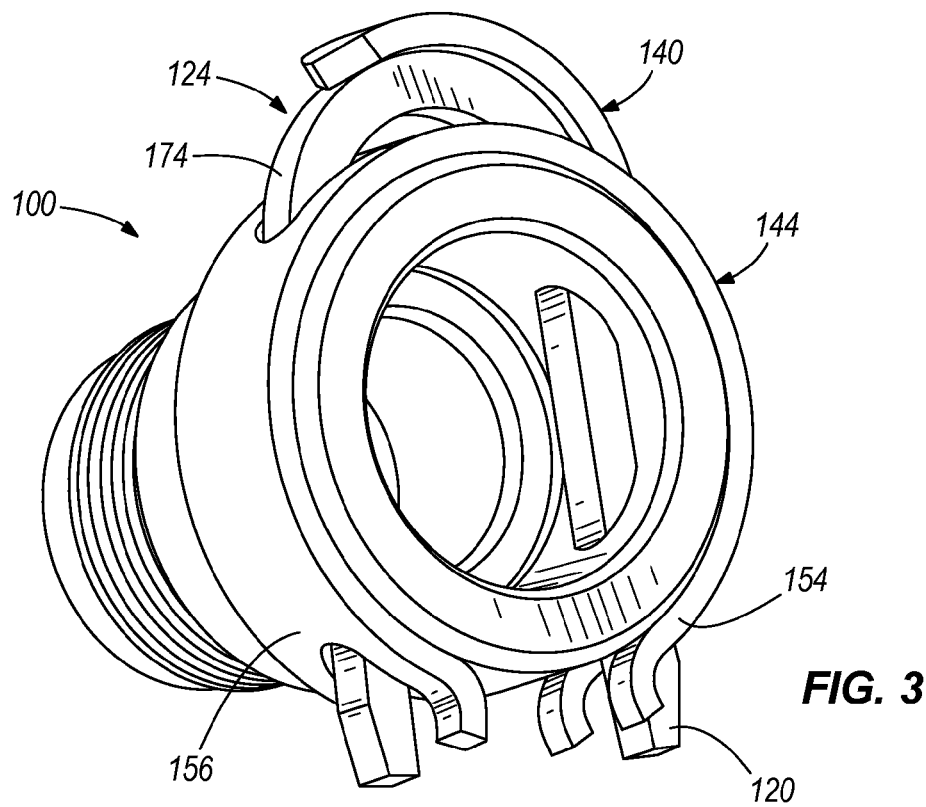
FIG. 3 is a perspective view of a female sleeve piece, a U-shaped staple, and a first embodiment of a pin retention clip.
Figure 4:
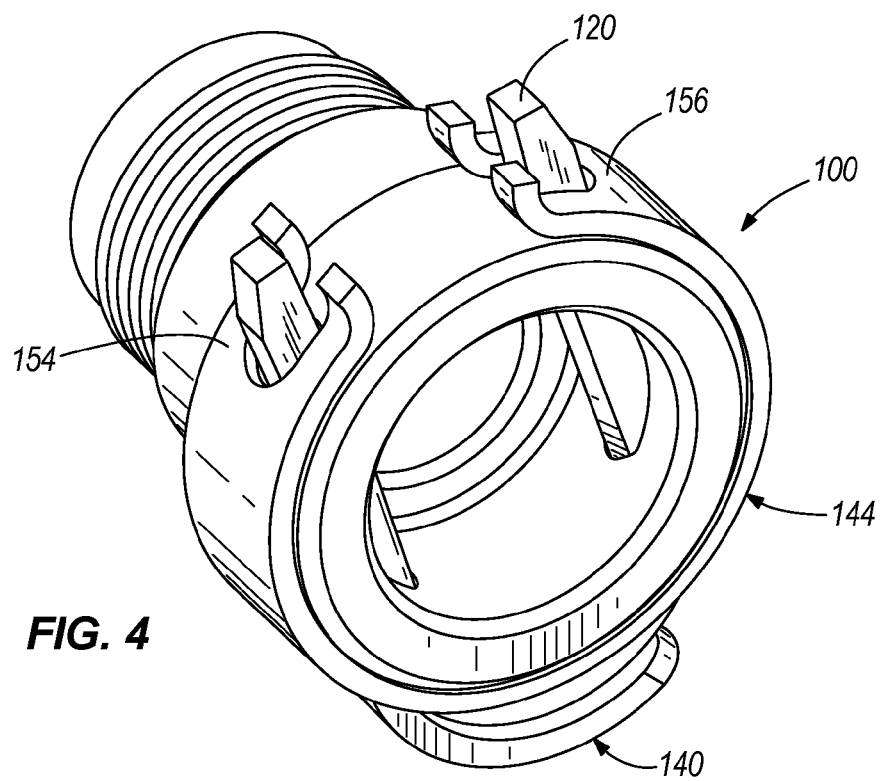
FIG. 4 is a perspective view of the bottom of the assembly shown in FIG. 3.
Figure 5:
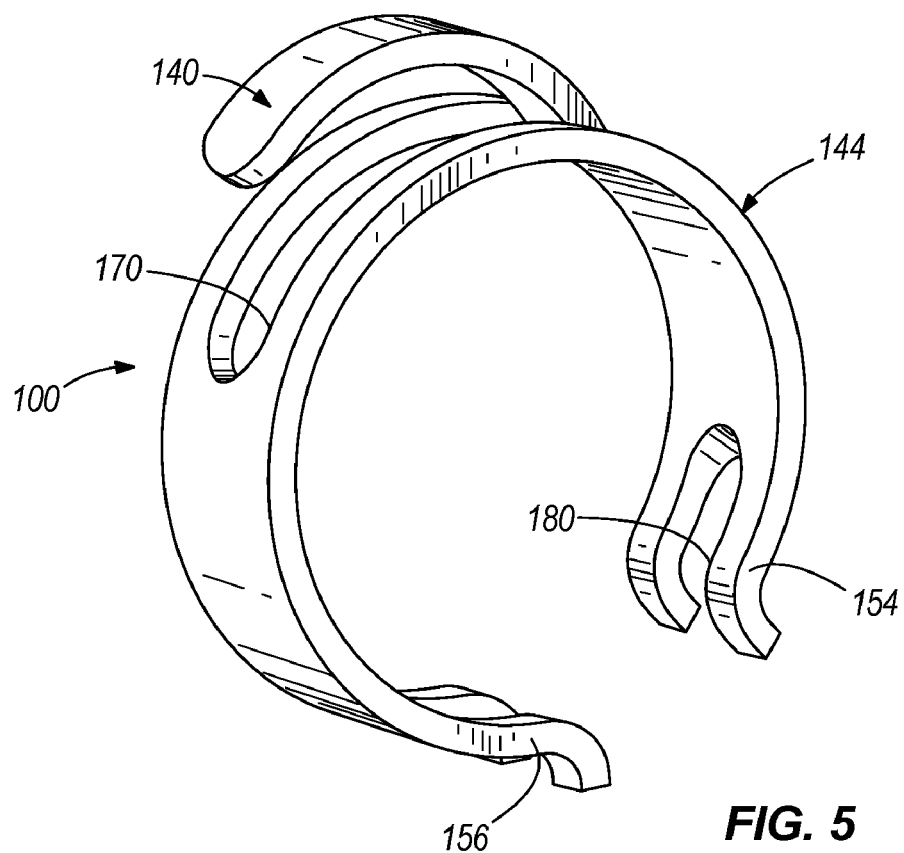
FIG. 5 is a perspective view of the pin retention clip shown in FIG. 3.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Figure 6:
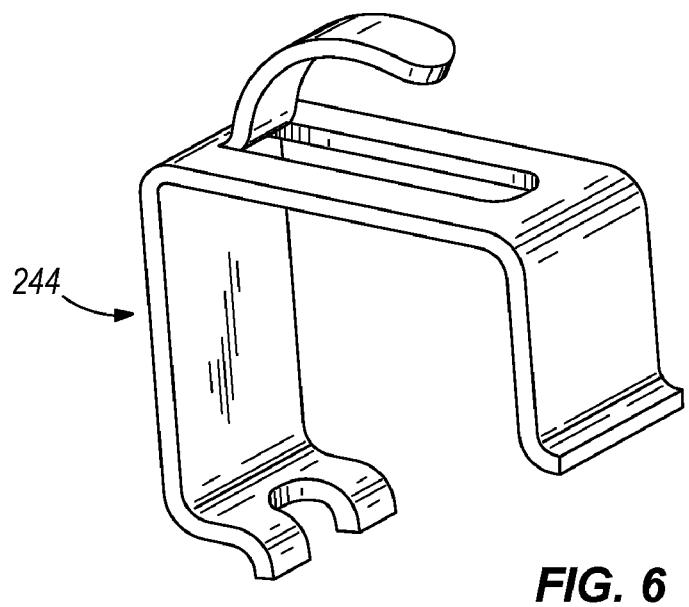
FIG. 6 is a perspective view of a second embodiment of the pin retention clip.
Figure 7:
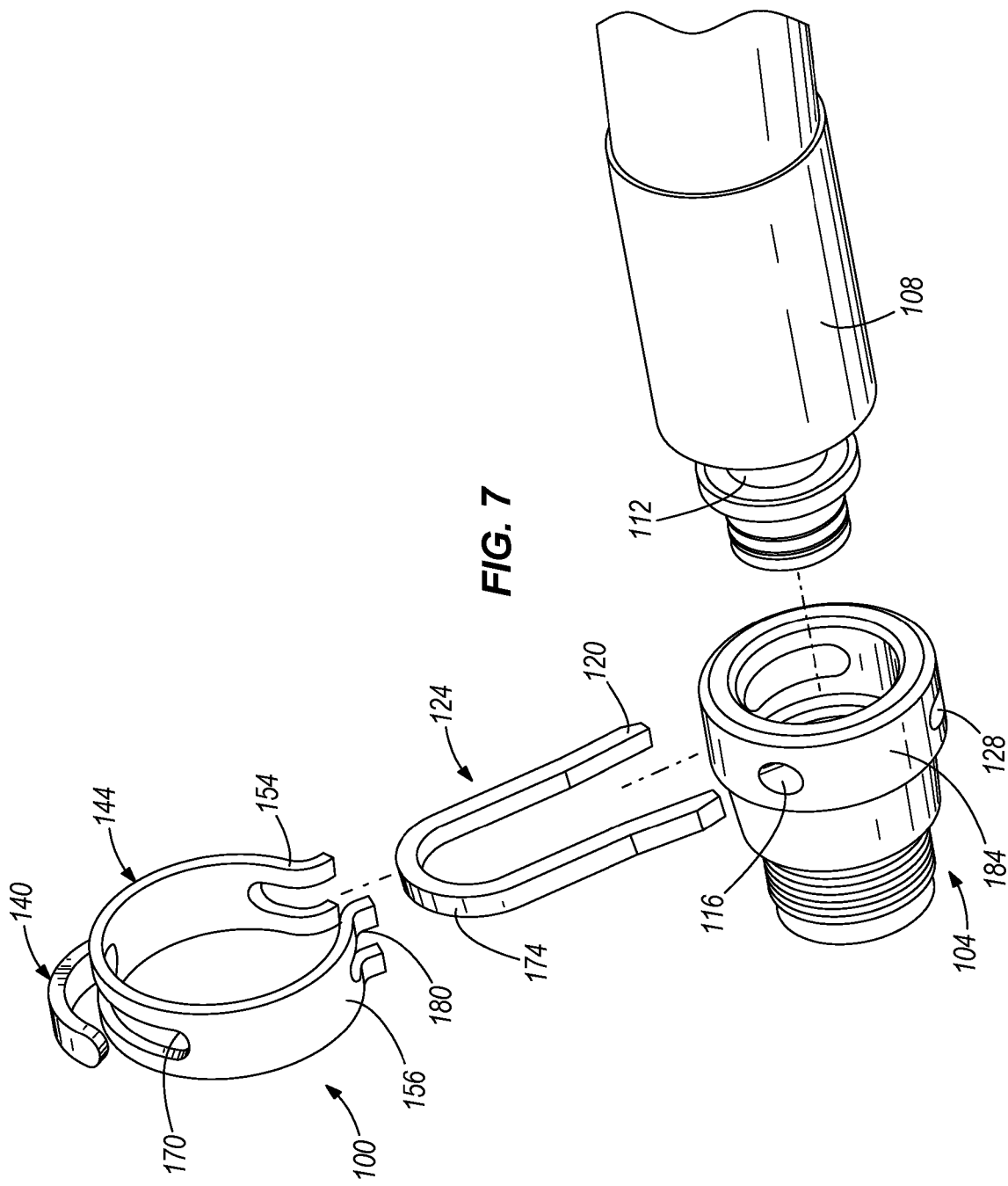
FIG. 7 is an exploded view of a hydraulic connection including a female sleeve piece, a male piece, a U-shaped staple, and a pin retention clamp.

FIGS. 3 through 7 illustrate a clip 100 for a connection between two members 104 and 108 (see FIG. 7). In the preferred embodiment, the members are hydraulic hoses, but in other embodiments, not shown, the clip 100 can be used with any two pieces requiring a connection. Still more particularly, the clip 100 can be used anywhere a pin needs to be retained in a bore in a member. In the illustrated embodiment, one member is a female sleeve piece 104, and the other member is a male piece 108 of a size and configuration to permit insertion into the female sleeve piece 104.

The male piece has a groove 112, and, when the male piece is received within the female sleeve piece, the groove is aligned with two spaced apart openings 116 (only one is shown in FIG. 7) in the female sleeve piece 104. The openings 116 receive the ends 120 of a pin 124 in the form of a U-shaped staple. The legs of the U-shaped staple are received within the groove of the male piece 108 and secured by the female sleeve piece 104, thus locking the male piece 108 within the female piece 104. The free ends 120 of the stable also extend through aligned openings 128 (only one is shown in FIG. 7) in the opposite side of the female sleeve piece 104. If one attempts to remove the male piece from the female piece, the portion of the male piece forming the groove contacts the staple legs, thus preventing the male piece 108 from being removed from the female piece 104.

More particularly, the staple 124 is shaped so that, when fitted, the staple is self-retaining. The open ends 120 are wider than the portion of the staple that retains the male piece 108. The open ends 120 are initially squeezed together so that the staple 124 can be pushed into the openings 116 through the female sleeve piece. The open ends of the staple then spring out, once the staple is fully inserted. This retains the staple within the hose connection.

In other less preferred embodiments, not shown, the pin could be a cotter pin received within an opening that passes through a member, the pin preventing the sliding of a sleeve over the member, for example.

The illustrated clip 100 comprises a pin-retaining portion 140 and a clamp portion 144 that surrounds a female sleeve piece outer surface 184. The clamp portion 144 includes at least a first end 154 and a second end 156. In the preferred embodiment, the clamp portion 144 is an integral piece. In other less preferred embodiments, not shown, the clamp portion can be formed of separate pieces that lock together around the outer surface of the connection, as further explained below.

The clamp portion 144 is movable between a first closed position and a second open position, the clip clamp portion first and second ends being separable, first, so that they can be distanced sufficiently so that the clamp portion 144 can be placed over the member outer surface 184 and, second, so that the first and second ends can be placed in a less separated position after being placed over the member outer surface 184. Thus the clamp portion 144 at least partially surrounds the member 104 and is held on the member 104. In other words, the clip clamp portion 144 is movable between a first relaxed position and a second expanded position, said clip clamp portion being sufficiently flexible so that said clamp first and second ends can be first, be distanced sufficiently so that said clip clamp portion can be placed over said cable outer surface and second, so that said first and second ends return to a positively clamped position, either in the first relaxed position or between the first relaxed and second expanded positions.

As explained above, the clamp portion 144 is preferably formed from an integral plastic or metal piece. The plastic or metal piece is flexible so that the ends of the clamp portion can be pulled apart in order to have the clamp portion fit around the member 104. In other less preferred embodiments, as explained above, the clamp portion can be made from separate pieces that lock together. In the alternative, some of the separate pieces could be hinged to one another.

The clamp portion 144 also has a pin-receiving opening 170 therein adapted to receive the exposed end 174 of the pin 124, with the pin-retaining portion 140 being adjacent the pin receiving opening 170 in order to retain the pin 124 in the member 104. In the preferred embodiment, the staple-retaining portion 140 is a flexible arm attached to the clip clamp portion 144. The flexible arm 140 is adapted to engage the closed end 174 of the staple 124. More particularly, the arm is semi circular, and the clip clamp portion 144 is semi circular, in order to have the clip 100 snugly fit around the cylindrical member 104. In other embodiments, as shown in FIG. 6, the clip clamp portion 244 can be rectangular in shape, in order to fit around a rectangular member, not shown.

Because staple connections come in a range of different sizes, the staple retaining clips have a similar number of sizes to match.

Figure 8:
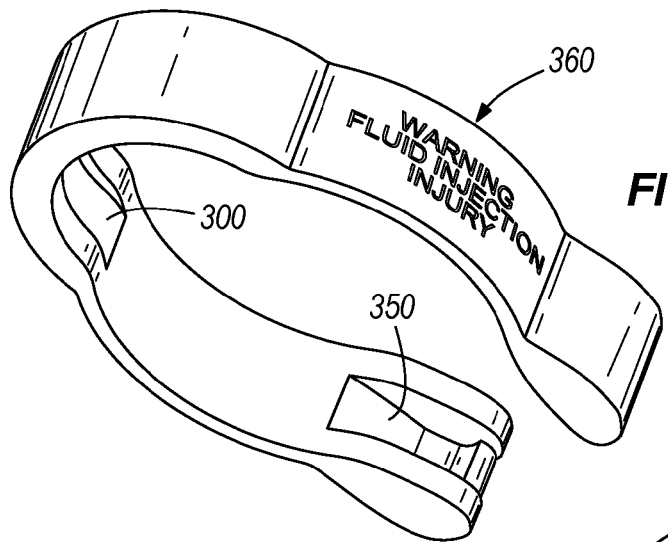
FIG. 8 is a top perspective view of a third embodiment of the pin retention clip, with a written warning added to the clip.
Figure 9:
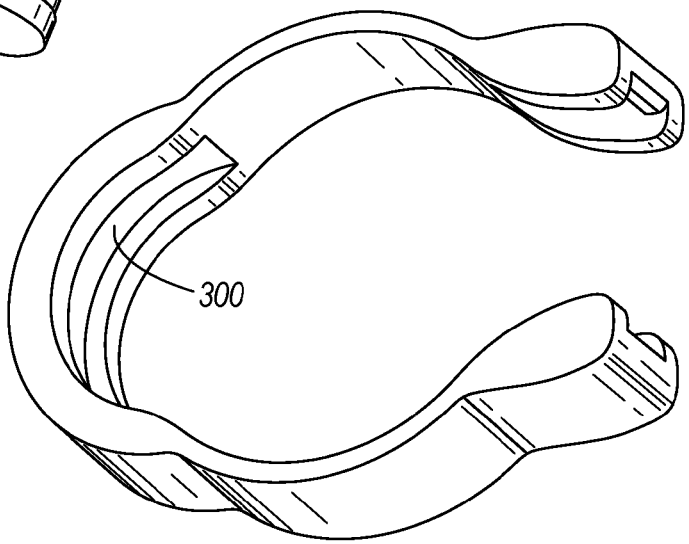
FIG. 9 is a bottom perspective view of the third embodiment of the pin retention clip shown in FIG. 8.
Figure 10:
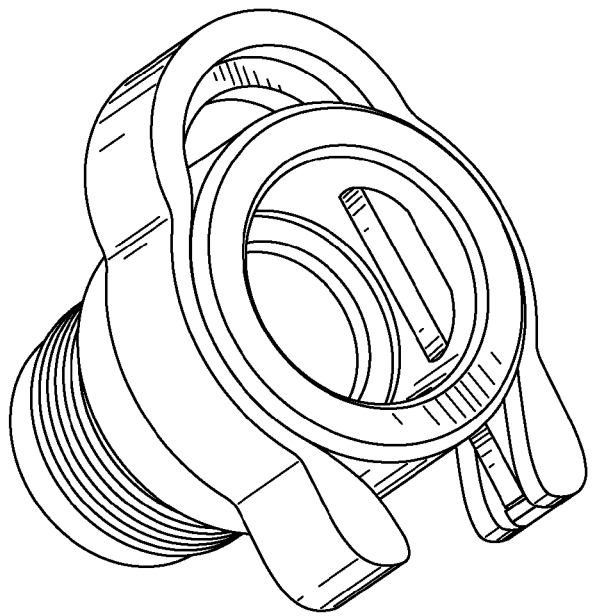
FIG. 10 is a perspective view of the third embodiment of the pin retention clip on a hydraulic hose connection.
Figure 11:
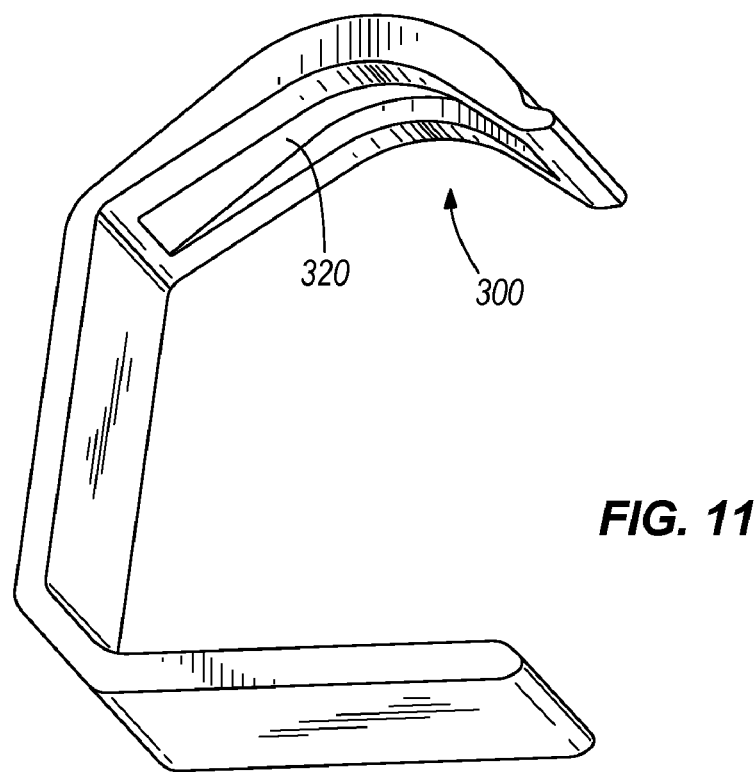
FIG. 11 is a top perspective view of a fourth embodiment of the pin retention clip.
Figure 12:
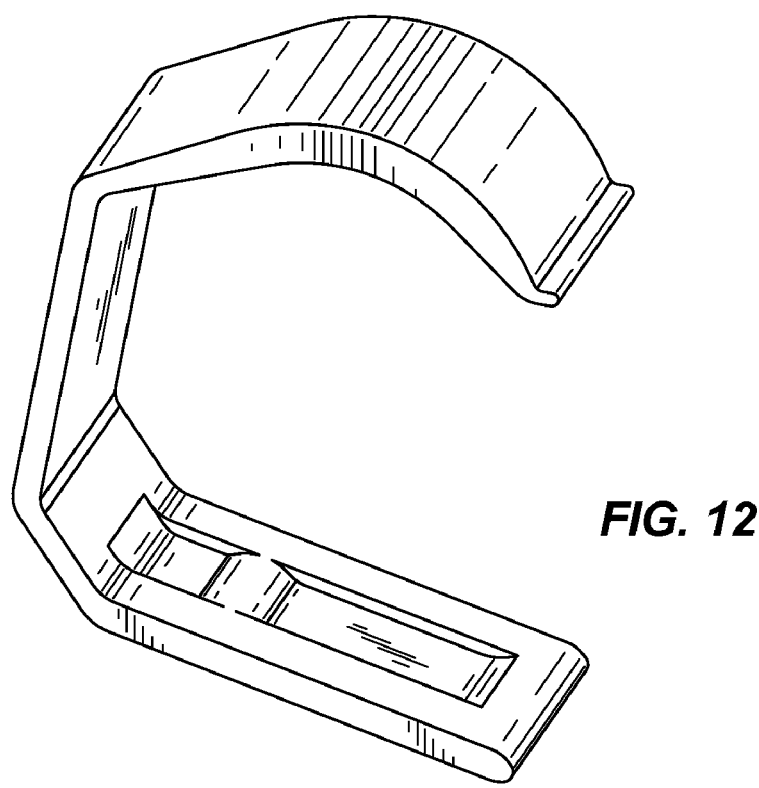
FIG. 12 is a bottom perspective view of the fourth embodiment of the pin retention clip shown in FIG. 11.
Figure 13:
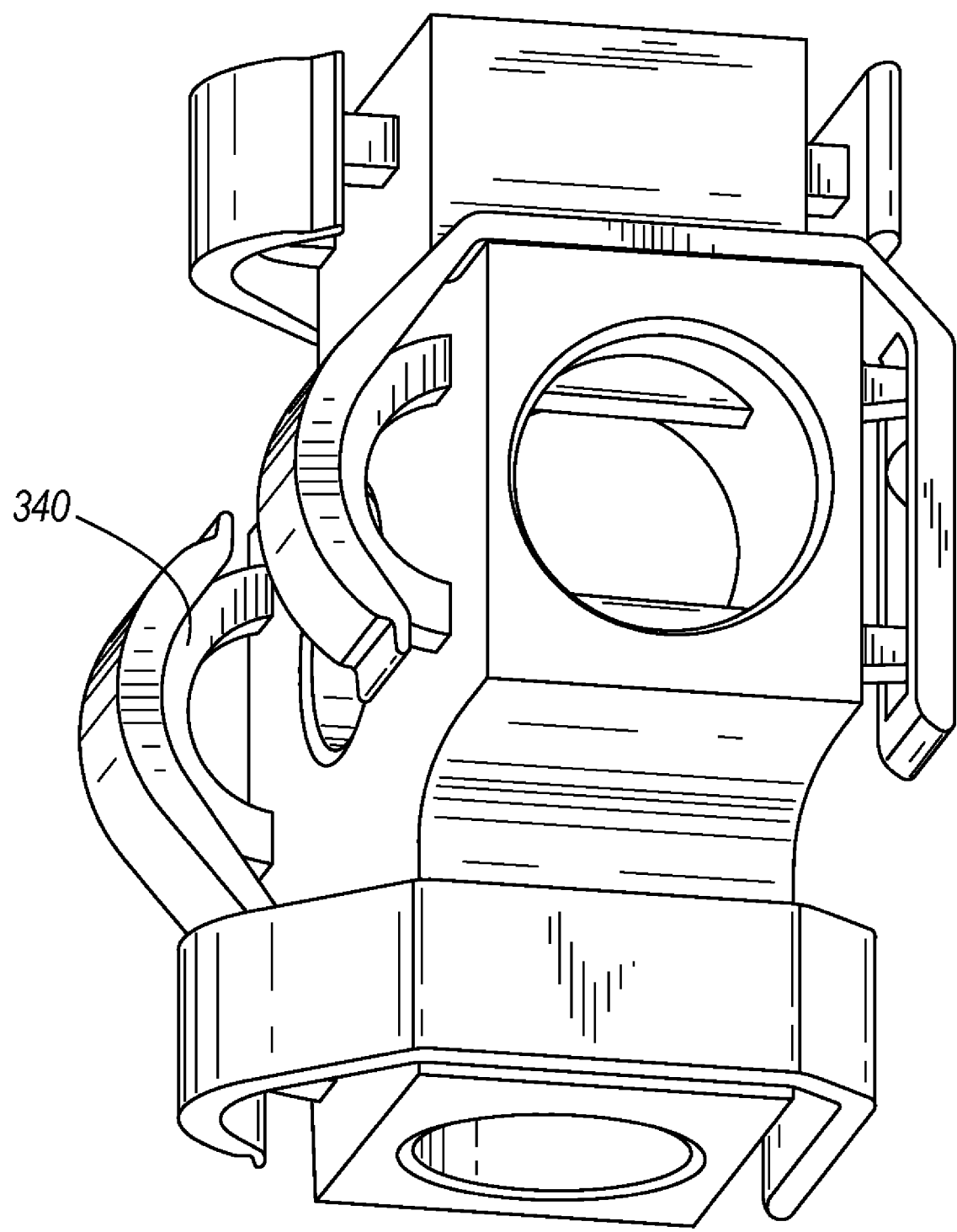
FIG. 13 is a perspective view of the fourth embodiment of the pin retention clip on a hydraulic hose connection.

Although, in the preferred embodiment, the pin-retaining portion 140 is a flexible arm, in other embodiments, as shown in FIGS. 8, 9 and 10, the pin-receiving opening in the clamp portion can be an indentation 300 in the clip. In such an embodiment, the walls of the indentation 300 serve as the pin-retaining portion to retain the pin within the connection. In yet another embodiment, as shown in FIGS. 11, 12 and 13, the pin-receiving opening 320 can be in a flexible arm 330 that wraps around the top of a pin 340.

In the preferred embodiment, the clip 100 is a brightly colored plastic, such as florescent orange, red, green or yellow. This makes it easier for one to verify that the clip is in place around a hose. Further, in the preferred embodiment, the first and the second ends 154 and 156 of the clamp portion 144 each has an opening 180 that receives an end of the U-shaped staple 124. This serves to further secure the clip 100 around the U-shaped staple, thus preventing the clip from sliding away from the staple 124. And in some embodiments, the clip can further include thereon text to be read by someone who sees the clip, as shown in FIG. 8.

Thus the staple 124 and clip 144 interact when a) part 174 of the staple protrudes through slot 170 or groove 300 of the clip and b) staple ends 120 pass through grooves in clip 100 or socket 350 to form a self retaining engagement.

The disclosed connection is made as follows. As illustrated in FIG. 7, the male piece 108 is inserted into the female sleeve piece 104. The free ends of the U-shaped staple 124 are then inserted into the openings 116 in the top of the female sleeve piece 104. The staple then continues being inserted until it passes through the groove 112 in the male piece 108, and then out of the opposite holes 128 in the female sleeve piece 104. The pin retention clip 100 is then placed around the connection, as follows. The free ends of the pin retention clip 100 are spread apart so that the pin retention clip 100 can pass over the connection. After the pin retention clip passes over the female sleeve piece 104, the clip free ends are then allowed to return to their original position, placing the openings or slots 180 around the free ends of the staple 124. Thus, the clip 100 is retained around the connection. The head 174 of the staple is received in the opening 170 in the top of the clip 124, and abuts the pin retention portion 140 of the clip 100. The pin retention portion of the clip thus holds the staple within the connection.

Various other features and advantages of the disclosure will be apparent from the following claims.

The invention claimed is:

1. A resilient clip for retaining a pin that connects members, the pin including two pin legs and a head portion connecting the pin legs, the clip comprising:
   a first clip leg defining a first end portion, the first end portion including a first socket formed therein for receiving one of the pin legs;

a second clip leg defining a second end portion, the second end portion including a second socket formed therein for receiving the other of the pin legs; and a pin-retaining portion extending between the first and the second clip legs, the pin-retaining portion being recessed relative to adjacent retaining walls and defining a channel for receiving the head portion when the clip is secured around the pin, wherein the first and second clip legs are connected to each other solely by the pin-retaining portion, wherein the first end portion and the second end portion each include an opposing pair of socket walls that define the respective first and second sockets, and wherein the socket walls extend substantially parallel to the retaining walls.

2. The clip of claim 1, wherein the first and second sockets are substantially aligned with the channel.

3. The clip of claim 1, wherein the retaining walls and the socket walls have substantially the same thickness.

4. The clip of claim 1, wherein the first clip leg includes a first curved portion positioned between the pin-retaining portion and the first socket, and wherein the second clip leg includes a second curved portion positioned between the pin-retaining portion and the second socket.

5. The clip of claim 1, wherein at least a portion of the pin-retaining portion is semi-circular.

* * * * *